US009161331B2

(12) United States Patent
Cui et al.

(10) Patent No.: US 9,161,331 B2
(45) Date of Patent: Oct. 13, 2015

(54) POSITIONING ENHANCEMENT SYSTEMS AND METHODS

(71) Applicant: FutureWei Technologies, Inc., Plano, TX (US)

(72) Inventors: Jie Cui, Beijing (CN); Dengkun Xiao, Beijing (CN); Xiang Chen, Lake Zurich, IL (US); Jing Han, Beijing (CN); Anjian Li, Beijing (CN)

(73) Assignee: Futurwei Technologies, Inc., Plano, TX (US)

( * ) Notice: Subject to any disclaimer, the term of this patent is extended or adjusted under 35 U.S.C. 154(b) by 191 days.

(21) Appl. No.: 13/668,032

(22) Filed: Nov. 2, 2012

(65) Prior Publication Data

US 2013/0137454 A1 May 30, 2013

Related U.S. Application Data

(60) Provisional application No. 61/556,007, filed on Nov. 4, 2011.

(51) Int. Cl.
| H04M 1/00 | (2006.01) |
| H04W 64/00 | (2009.01) |
| H04W 24/02 | (2009.01) |
| G01S 5/02 | (2010.01) |
| H04W 24/10 | (2009.01) |

(52) U.S. Cl.
CPC ............. *H04W 64/003* (2013.01); *G01S 5/021* (2013.01); *H04W 24/02* (2013.01); *H04W 24/10* (2013.01); *H04W 64/00* (2013.01)

(58) Field of Classification Search
USPC ........................................... 455/456.1–456.6
See application file for complete search history.

(56) References Cited

U.S. PATENT DOCUMENTS

| 5,886,988 | A | 3/1999 | Yun et al. |
| 2005/0048922 | A1* | 3/2005 | Lee et al. ......................... 455/65 |
| 2011/0080302 | A1* | 4/2011 | Muthaiah et al. ............. 340/903 |

FOREIGN PATENT DOCUMENTS

CN           1242909 A       1/2000

OTHER PUBLICATIONS

3GPP TS 36.355 v10.3.0 (Sep. 2001).*

(Continued)

*Primary Examiner* — Brandon Miller
(74) *Attorney, Agent, or Firm* — Slater & Matsil, L.L.P.

(57) ABSTRACT

Systems and methods are disclosed to provide positioning enhancement to wireless systems to determine UE positioning using UE measurements. A method implemented by a UE for enabling positioning calculation includes receiving a Signal to Interference plus Noise Ratio (SINR) threshold from a network for filtering positioning measurements and performing a plurality of positioning measurements. The method also includes removing from the positioning measurements each measurement that does not meet the SINR threshold, and sending remaining positioning measurements that meet the SINR threshold to the network. Another method implemented by a network component includes receiving a plurality of positioning measurements with a plurality of corresponding SINRs from a user device and removing from the positioning measurements each measurement with a corresponding SINR that is less than or equal to a pre-determined SINR threshold. The remaining positioning measurements with corresponding SINRs greater than the SINR threshold are then used for positioning calculation.

24 Claims, 2 Drawing Sheets

(56) References Cited

OTHER PUBLICATIONS

3GPP TS 36.331 V10.1.0 (Mar. 2011).*
3GPP TS 32.762 V10.5.0 (Sep. 2011).*
Notification of Transmittal of the International Search Report and the Written Opinion of the International Searching Authority, or the Declaration for PCT/US12/63580, mailed Feb. 4, 2013, 9 pages.
3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331 v 10.1.0, Mar. 2011, 290 pages.
3rd Generation Partnership Project: Techinical Specification Group Radio Access Network; Evolved Universal Terrestrial Radio Access (E-UTRA); LTE Positioning Protocol (LPP) (Release 10), 3GPP TS 36.355 v 10.3.0, Sep. 2011, 115 pages.
3GPP, 3rd Generation Partnership Project;Technical Specification Group Radio Access Network; Evolved Universal Terrestrial Radio Access (E-UTRA); LTE Positioning Protocol A (LPPa) (Release 11), 3GPP TS 36.455 V11.0.0, Sep. 2012, 52 pages.
3GPP, "3rd Generation Partnership Project; Technical Specification Group Radio Access Network; Evolved Universal Terrestrial Radio Access (E-UTRA); Requirements for support of radio resource management (Release 11)," 3GPP TS 36.133 V11.2.0, Sep. 2012, 672 pages.
Search Report received in Chinese Application No. CN2012800530967 dated Apr. 3, 2015, 2 pages.
Office Action received in Chinese Application No. CN2012800530967 dated Apr. 15, 2015, 7 pages.

* cited by examiner

POSITIONING ENHANCEMENT SYSTEMS AND METHODS

This application claims the benefit of U.S. Provisional Application Ser. No. 61/556,007, filed on Nov. 4, 2011, and entitled "Positioning Enhancement System and Method," which is incorporated herein by reference as if reproduced in its entirety.

TECHNICAL FIELD

The present invention relates to the field of wireless communications, and, in particular embodiments, to systems and methods for implementing positioning enhancement systems and methods.

BACKGROUND

In Evolved Universal Terrestrial Radio Access (E-UTRA) systems, an enhanced Serving Mobile Location Center (e-SMLC) uses positioning related measurement results from a target user equipment (UE) to locate the UE. Cell-specific Reference Signals (CRS) measurements are utilized for enhanced Cell ID (e-CID), Radio Frequency Pattern Matching (RFPM), and Observed Time Difference Of Arrival (OT-DOA) positioning methods. For e-CID, the UE reports UE Reception-Transmission (Rx-Tx) time difference, Reference Signal Received Power (RSRP), and Reference Signal Recieved Quality (RSRQ) to the network, but does not report-Cell-specific Reference Signals (CRS) Signal to Interference plus Noise Ratio (SINR) (or Es/Iot). Without CRS SINR, the network cannot be aware of the real condition the target UE is experiencing, and therefore the positioning measurement results reported by the UE in a bad wireless condition (e.g., high interference condition) is likely to be used in UE location calculation in positioning server, which results in a positioning error.

For RFPM, the reported RSRP or RSRQ is used for fingerprint mapping. However, similar to the e-CID scheme, the UE reports the RSRP and RSRQ to the network but without CRS SINR (or Es/Iot), and therefore the network cannot distinguish which RSRP and RSRQ measurements are believable for positioning. If the network used the RSRP measurement results of relatively or substantially low SINR, the measurement error of this RSRP can be significant and degrade positioning performance. For OTDOA, the reported Reference Signal Time Difference (RSTD) is used for OTDOA positioning. However, the Positioning Reference Signal (PRS) SINRs of different cells are not provided to the network. If the e-SMLC uses all the reported RSTDs, the RSTDs from a relatively or substantially low PRS SINR cell can negatively impact positioning accuracy. Thus, considering the SINR condition for positioning calculation is beneficial to improve positioning accuracy.

SUMMARY

In one embodiment, a method implemented by a user device for enabling positioning calculation includes receiving a Signal to Interference plus Noise Ratio (SINR) threshold from a network for filtering positioning measurements, performing a plurality of positioning measurements, removing from the positioning measurements each measurement that does not meet the SINR threshold, and sending remaining positioning measurements that meet the SINR threshold to the network.

In another embodiment, a user device for supporting positioning calculation includes a processor and a computer readable storage medium storing programming for execution by the processor, the programming including instructions to receive a SINR threshold from a network for filtering positioning measurements, perform a plurality of positioning measurements, remove from the positioning measurements each measurement that does not meet the SINR threshold, and send remaining positioning measurements that meet the SINR threshold to the network.

In another embodiment, a method implemented by a network component for enabling positioning calculation includes receiving a plurality of positioning measurements with a plurality of corresponding SINRs from a user device, removing from the positioning measurements each measurement with a corresponding SINR that is less than or equal to a pre-determined SINR threshold, and using remaining positioning measurements with corresponding SINRs greater than the SINR threshold for positioning calculation.

In another embodiment, an apparatus component for supporting positioning calculation includes a processor and a computer readable storage medium storing programming for execution by the processor, the programming including instructions to receive a plurality of positioning measurements with a plurality of corresponding SINRs from a user device, remove from the positioning measurements each measurement with a corresponding SINR that is less than or equal to a pre-determined SINR threshold, and use remaining positioning measurements with corresponding SINRs greater than the SINR threshold for positioning calculation.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
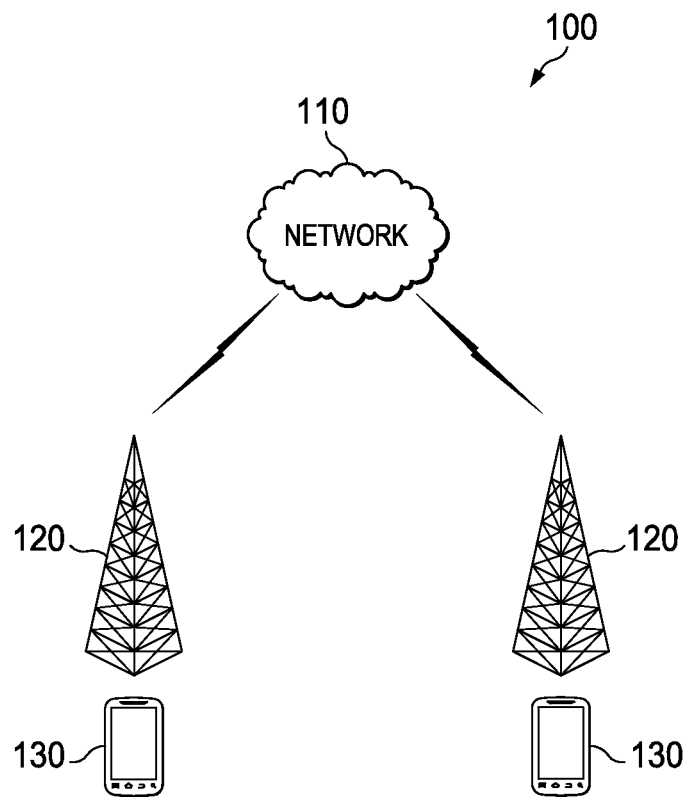
FIG. 1 illustrates an example of a wireless system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Currently, the accuracy requirement of UE Rx-Tx time difference measurement, RSRP/RSRQ measurement, and RSTD measurement are specified in 3GPP Specification TS36.133 section 9 (which is incorporated herein by reference), as shown in Tables 1, 2, and 3 below.

TABLE 1

UE Rx-Tx time difference measurement accuracy

| | | | | Conditions | | | | |
|---|---|---|---|---|---|---|---|---|
| Parameter | Downlink Bandwidth [MHz] | Unit | Accuracy [Ts] | Bands 1, 4, 6, 10, 11, 18, 19, 21, 23, 24, 33, 34, 35, 36, 37, 38, 39, 40, 42, 43 Io | Bands 2, 5, 7 Io | Bands 25 Io | Bands 3, 8, 12, 13, 14, 17, 20 Io | Bands 9, 41 Io |
| UE RX-TX time difference for $\hat{E}s/Iot \geq -3$ dB | ≤3 MHz<br>≥5 MHz | $T_s$ | ±20<br>±10 | −121dBm/<br>15 kHz ...<br>−50dBm/<br>$BW_{Channel}$ | −119dBm/<br>15 kHz ...<br>−50dBm/<br>$BW_{Channel}$ | −117.5dBm/<br>15 kHz ...<br>−50dBm/<br>$BW_{Channel}$ | −118dBm/<br>15 kHz ...<br>−50dBm/<br>$BW_{Channel}$ | −120dBm/<br>15 kHz ...<br>−50dBm/<br>$BW_{Channel}$ |

Note 1: Io is assumed to have constant EPRE across the bandwidth.
Note 2: Ts is the basic timing unit defined in TS 36.211.

TABLE 2

RSRP Intra frequency absolute accuracy

| | | Accuracy [dB] | | Conditions[1] | | | | |
|---|---|---|---|---|---|---|---|---|
| Parameter | Unit | Normal condition | Extreme condition | Bands 1, 4, 6, 10, 11, 18, 19, 21, 23, 24, 33, 34, 35, 36, 37, 38, 39, 40 Io | Bands 2, 5, 7 Io | Band 25 Io | Bands 3, 8, 12, 13, 14, 17, 20, 22 Io | Bands 9, 41, 42, 43 Io |
| RSRP for $\hat{E}s/Iot \geq -6$ dB | dBm | ±6 | ±9 | −121dBm/<br>15 kHz ...<br>−50dBm/<br>$BW_{Channel}$ | −119dBm/<br>15 kHz ...<br>−50dBm/<br>$BW_{Channel}$ | −117.5dBm/<br>15 kHz ...<br>−50dBm/<br>$BW_{Channel}$ | −118dBm/<br>15 kHz ...<br>−50dBm/<br>$BW_{Channel}$ | −120dBm/<br>15 kHz ...<br>−50dBm/<br>$BW_{Channel}$ |
| RSRP for $\hat{E}s/Iot \geq -6$ dB | dBm | ±8 | ±11 | −70dBm/<br>15 kHz ...<br>−50dBm/<br>$BW_{Channel}$ | −70dBm/<br>15 kHz ...<br>−50dBm/<br>$BW_{Channel}$ | −70dBm/<br>15 kHz ...<br>−50dBm/<br>$BW_{Channel}$ | −70dBm/<br>15 kHz ...<br>−50dBm/<br>$BW_{Channel}$ | −70dBm/<br>15 kHz ...<br>−50dBm/<br>$BW_{Channel}$ |

Note
[1] Io is assumed to have constant EPRE across the bandwidth.

TABLE 3

RSTD Intra frequency absolute accuracy

| Parameter | Minimum PRS transmission bandwidth between the reference cell and the measured neighbour cell [RB] | Minimum number of available measurement subframes between the reference cell and the measured neighbour cell | Unit | Accuracy [Ts] | Conditions | | | | |
|---|---|---|---|---|---|---|---|---|---|
| | | | | | Bands 1, 4, 6, 10, 11, 18, 19, 21, 23, 24, 33, 34, 35, 36, 37, 38, 39, 40 Io | Bands 2, 5, 7 Io | Band 25 Io | Bands 3, 8, 12, 13, 14, 17, 20, 22 Io | Bands 9, 41, 42, 43 Io |
| RSTD for (PRS $\hat{E}s/Iot)_{ref} \geq -6$ dB and (PRS $\hat{E}s/Iot)_i \geq -13$ dB | ≥6<br>≥25<br>≥50 | 6<br>≥2<br>≥1 | $T_s$ | ±15<br>±6<br>±5 | −121dBm/<br>15 kHz ...<br>−50dBm/<br>$BW_{Channel}$ | −119dBm/<br>15 kHz ...<br>−50dBm/<br>$BW_{Channel}$ | −117.5dBm/<br>15 kHz ...<br>−50dBm/<br>$BW_{Channel}$ | −118dBm/<br>15 kHz ...<br>−50dBm/<br>$BW_{Channel}$ | −120dBm/<br>15 kHz ...<br>−50dBm/<br>$BW_{Channel}$ |

Note 1: Io is assumed to have constant EPRE across the bandwidth.
Note 2: Ts is the basic timing unit defined in TS 36.211 [16].

The above tables show that for each measurement accuracy requirement, the side condition is set as a precondition for the specification, i.e., the measurement accuracy is fulfilled under the side condition, otherwise the measurement accuracy may degrade significantly. For UE Rx-Tx measurement, a CRS Es/Iot≥−3 decibel (dB) is the side condition, and the UE Rx-Tx time difference measurement results of the condition CRS Es/Iot≥−3 dB is considered as believable (or acceptable) input for e-CID positioning calculation from the network side. Similarly, the RSRP measurement results of the condition CRS Es/Iot≥−6 dB is considered as believable input for RFPM positioning calculation from the network side; and the RSTD measurement results of Positioning Reference Signal (PRS) Es/Iot≥−13 dB is considered as believable input for OTDOA positioning calculation from the network side.

If the UE does not filter the measurement results that do not fulfill the side condition or the UE does not report the positioning signal (CRS, PRS) SINR to the network together with the positioning measurement results, there are two potential risk points or issues: (1) The UE wastes signaling resource to report the measurement results with relatively or substantially measurement error to the network, and (2) the reported incorrect measurement results can degrade the positioning performance significantly.

Disclosed herein are systems and methods to overcome the issues above and provide positioning enhancement to wireless systems that use UE measurement results to determine UE positioning. In an embodiment system and method, a UE filters its positioning measurement results by removing measurements with a low SINR threshold. The low SINR threshold is pre-determined and indicated by the network. Thus, the UE reports the remaining suitable measurements without the removed measurements, which can result in improved positioning accuracy. In another embodiment system and method, the UE reports all its positioning measurement results with the corresponding SINR values to the network. The network can then filters out the low SINR measurements according to a pre-determined low SINR threshold, and hence processes the remaining measurements to achieve improved positioning accuracy.

FIG. 1 illustrates an example of a wireless system 100 that includes a core network 110, one or more radio access nodes (RANS) 120, and one or more user equipments (UEs) 130. The wireless network system 100 may be any wireless or cellular network, such as an E-UTRAN system, a Wideband Code Division Multiple Access (WCDMA) UTRAN system, a Global System for Mobile Communications (GSM) system, a General Packet Radio Service (GPRS) system, a Code Division Multiple Access (CDMA) system, an Evolution-Data Optimized (EV-DO) system, an Enhanced Data Rates for GSM Evolution (EDGE) system, other systems, or combinations thereof. The core network 110 may be any network managed by an operator, e.g., a mobile or cellular network operator, and used as a backhaul for the system 100. For example, the core network may be an IP network. The RAN 120 is any base station or wireless radio transmitter/receiver (transceiver) component that provide the UEs 130 wireless access to the core network 110 or system 100. For example, the RAN 120 is an E-UTRAN node B (eNB). Each RAN 120 has a coverage range referred to as a cell. The UEs 130 are any mobile user devices that communicate with the RANs within the same cell (and hence the core network 110) using wireless or cellular links. Examples of the UEs 130 include cellular phones and smartphones, computer tablets, and computer laptops that are configured with cellular technology.

The UE 130 is configured to perform measurements and send the measurement results, such as in a measurement report, to the RAN 120, the core network 110, or a server or component (not shown) configured to process the measurement results (or report) in the system 100. The UE 130 may perform measurements as instructed by the system 100. The RAN 120 sends measurement configurations to the UE 130 for performing the measurements. The measurements are then used by the core network 110 or the system 100 to calculate the position of the UE 130.

In a first embodiment, the RAN 120 defines a low SINR threshold and sends the UE 130 the positioning measurement configurations with the low SINR threshold for filtering the measurements at the UE 130. The UE 130 is configured to filter out or remove the measurements below the threshold. A Radio Resource Control (RRC) signaling can be configured to signal the low SINR threshold to the UE 130. The Information Element (IE) ReportConfigEUTRA of the TS36.331, which is incorporated herein, can be modified as shown further below.

The modification to the IE above is indicate by bold and italicized text, i.e., the sinrThresOfRSRP, sinrThresOfRSRQ, and sinrThresOfUeRxTx and associated parameters, where x is the max mapping level of corresponding SINR.

If inter Radio Access Technology (inter-RAT) is considered in RFPM, the SINR threshold for UTRAN Frequency Division Duplex (FDD), GSM, and CDMA2000 may be included in the RRC signaling. The IE ReportConfigInter-RAT of TS.36.331 specifies criteria for triggering of an inter-RAT measurement reporting event. The inter-RAT measurement reporting events are labelled BN with N equal to 1, 2 and so on. For example, Event B1 indicates Neighbour becomes better than absolute threshold; and Event B2 indicates parameterized cell (Pcell) becomes worse than absolute threshold) AND Neighbour becomes better than another absolute threshold2. The b1 and b2 event thresholds for CDMA2000 are the CDMA2000 pilot detection thresholds and are expressed as an unsigned binary number equal to [−2×10 log 10 $E_c/I_o$] in units of 0.5 dB.

To signal the low SINR threshold to the UE 130, the IE ReportConfigInterRAT of TS36.331 can be modified (indicated by bold and italic text) as shown further below.

For e-CID and RFPM, an e-SMLC (in the system 100) signals a CRS SINR threshold via LTE Positioning Protocol (LPP) signaling, which is then used by the UE 130 for filtering the positioning measurement results. The IE ECID-RequestLocationInformation of TS36.355, which is incorporated herein, can be modified (indicated by bold and italic text) as follows:

```
-- ASN1START
ECID-RequestLocationInformation ::= SEQUENCE {
        requestedMeasurements         BIT STRING {  rsrpReq        (0),
                                                    rsrqReq        (1),
                                                    ueRxTxReq      (2)     } (SIZE(1..8)),
        sinrThresOfUeRxTx    INTEGER (0..x)                        OPTIONAL,
        sinrThresOfRSRP      INTEGER (0..x)                        OPTIONAL,
        sinrThresOfRSRQ      INTEGER (0..x)                        OPTIONAL,
    ...
}
-- ASN1STOP
```

For e-CID and RFPM, the e-SMLC sends a CRS SINR threshold to the RAN 120 (e.g., eNB) via LPPa signaling and then the RAN 120 sends this threshold to the UE 130 via RRC signaling as indicated above. An e-CID measurement initiation request of TS36.455, which incorporated herein by reference, is sent from the e-SMLC to the RAN 120 (or enB). The e-CID measurement initiation request can be modified (indicated by underlined text) as shown in Table 4:

TABLE 4

| IE/Group Name | Presence | Range | IE type and reference | Criticality | Assigned Criticality |
|---|---|---|---|---|---|
| Message Type | M | | 9.2.3 | YES | reject |
| LPPa Transaction ID | M | | 9.2.4 | — | — |
| E-SMLC Measurement ID | M | | INTEGER(1 ... 15, ...) | YES | reject |
| Report Characteristics | M | | ENUMERATED (OnDemand, Periodic, ...) | YES | reject |
| Measurement Periodicity | C-ifReportCharacteristics Periodic | | ENUMERATED(120 ms, 240 ms, 480 ms, 640 ms, 1024 ms, 2048 ms, 5120 ms, 10240 ms, 1 min, 6 min, 12 min, 30 min, 60 min, ...) | YES | reject |
| Measurement Quantities | | 1 ... <maxnoMeas> | | EACH | reject |
| >Measurement Quantities Item | M | | ENUMERATED (Cell-ID, Angle of Arrival, Timing Advance Type 1, Timing Advance Type 2, RSRP, RSRQ, SINRThresOfRSRP, SINRThresOfRSRQ, SINRThresOfUeRxTx ...) | — | — |

A corresponding IE of TS36.455 is modified (indicated by bold and italicized text) as follows:

```
MeasurementQuantities-Item ::= SEQUENCE {
    measurementQuantitiesValue          MeasurementQuantitiesValue,
    iE-Extensions                       ProtocolExtensionContainer { {
MeasurementQuantitiesValue-ExtIEs} } OPTIONAL,
    ...
}
MeasurementQuantitiesValue-ExtIEs LPPA-PROTOCOL-EXTENSION ::= {
    ...
}
MeasurementQuantitiesValue ::= ENUMERATED {
    cell-ID,
    angleOfArrival,
    timingAdvanceType1,
    timingAdvanceType2,
    rSRP,
    rSRQ,
    sINRThresOfRSRP,
    sINRThresOfRSRQ,
    sINRThresOfUeRxTx
    ...
}
```

For OTDOA, the e-SMLC sends a PRS SINR threshold to the UE 130 via LPP signaling for filtering positioning measurement results. Because RSTD is estimated from PRS from at least two cells (e.g., a neighbor cell and a reference cell), the SINR threshold of the reference cell and neighbor cell are provided. The IE OTDOA-RequestLocationInformation is used by a location server to request OTDOA location measurements from a target device. Details of the required measurements (e.g., details of assistance data of reference cell and neighbor cells) are conveyed in the OTDOA-ProvideAssistanceData IE in a separate Provide Assistance Data message. The IE OTDOA-RequestLocationInformation of TS36.355 can be modified (indicated by bold and italicized text) as follows:

```
-- ASN1START
OTDOA-RequestLocationInformation ::= SEQUENCE {
```

-continued

```
    assistanceAvailability          BOOLEAN,
    sinrThresOfReferenceCell INTEGER (0..x)       OPTIONAL,
    sinrThresOfNeighbourCell INTEGER (0..x)       OPTIONAL,
    ...
}
-- ASN1STOP
```

The UE 130 receives and uses the positioning signal SINR threshold to filter the measurement results of low SINR (doubtful measurement results). In TS36.331 and TS36.355, the UE 130 is configured to filter the measurement elements whose corresponding SINR are lower than the defined threshold.

In a second embodiment, the UE 130 reports all the positioning measurements and corresponding SINRs to the system 100 (e.g., a server for processing the measurements), where the measurements are then filtered to remove measurements with determined low SINR. The UE 130 reports the RSRP/RSRQ or UE Rx-Tx time difference measurement results with the corresponding CRS SINRs to the RAN 120 (eNB) via RRC signaling. The IE MeasResults (of the TS36.331), which covers measured results for intra-frequency, inter-frequency, and inter-RAT mobility, can be modified (indicated by bold and italicized text) as shown further below.

For e-CID and RFPM, the UE 130 reports the RSRP/RSRQ or UE Rx-Tx time difference measurement results with corresponding CRS SINRs to the e-SMLC via LPP signaling. The IE ECID-ProvideLocationInformation of TS36.355, which is used by the target device to provide e-CID location measurements to the location server, can be configured to provide an e-CID positioning error reason as follows:

```
-- ASN1START
ECID-ProvideLocationInformation ::= SEQUENCE {
    ecid-SignalMeasurementInformation    ECID-SignalMeasurementInformation    OPTIONAL,
    ecid-Error                           ECID-Error                           OPTIONAL,
    ...
}
-- ASN1STOP
```

The IE ECID-SignalMeasurementInformation of TS36.355 is used by the target device to provide various UE-measurements to the location server. The IE ECID-SignalMeasurementInformation can be modifies (indicated by bold and italicized text) to signal the CRS SINR as follows:

```
-- ASN1START
ECID-SignalMeasurementInformation ::= SEQUENCE {
    primaryCellMeasuredResults    MeasuredResultsElement OPTIONAL,
    measuredResultsList           MeasuredResultsList,
    ...
}
MeasuredResultsList ::= SEQUENCE (SIZE(1..32)) OF MeasuredResultsElement
MeasuredResultsElement ::= SEQUENCE {
    physCellId                   INTEGER (0..503),
    cellGlobalId                 CellGlobalIdEUTRA-AndUTRA    OPTIONAL,
    arfcnEUTRA                   ARFCN-ValueEUTRA,
    systemFrameNumber            BIT STRING (SIZE (10))       OPTIONAL,
    rsrp-Result                  INTEGER (0..97)              OPTIONAL,
    sinrOfRSRP-Result INTEGER (0..x)                          OPTIONAL,
    rsrq-Result                  INTEGER (0..34)              OPTIONAL,
    sinrOfRSRQ-Result INTEGER (0..x)                          OPTIONAL,
    ue-RxTxTimeDiff INTEGER (0..4095)                         OPTIONAL,
    sinrOfUE-RxTxTimeDiff INTEGER (0..x)                      OPTIONAL,
    ...
}
-- ASN1STOP
```

For e-CID and RFPM, if the positioning measurement results are collected by the RAN 120 (eNB), the RAN 120 sends the measurement results together with the corresponding CRS SINR to the e-SMLC via LPPa signaling. An e-CID measurement initiation response of TS36.455 is sent from the the RAN 120 (or eNB) to the e-SMLC. The e-CID measurement initiation response can be configured as shown in Table 5:

TABLE 5

| IE/Group Name | Presence | Range | IE type and reference | Criticality | Assigned Criticality |
|---|---|---|---|---|---|
| Message Type | M | | 9.2.3 | YES | reject |
| LPPa Transaction ID | M | | 9.2.4 | — | |
| E-SMLC UE Measurement ID | M | | INTEGER(1 . . . 15, . . .) | YES | reject |
| eNB UE Measurement ID | M | | INTEGER(1 . . . 15, . . .) | YES | reject |
| E-CID Measurement Result | O | | 9.2.5 | YES | ignore |
| Criticality Diagnostics | O | | 9.2.2 | YES | ignore |

The E-CID measurement result message can also be sent in accordance with TS36.455 and is modified (indicate by underlined text) as shown in Table 6:

TABLE 6

| IE/Group Name | Presence | Range | IE Type and Reference | Semantics Description |
|---|---|---|---|---|
| Serving Cell ID | M | | ECGI 9.2.6 | E-UTRAN Cell Identifier of the serving cell |
| Serving Cell TAC | M | | OCTET STRING(2) | Tracking Area Code of the serving cell |
| E-UTRAN Access Point Position | O | | 9.2.8 | The configured estimated geographical position of the antenna of the cell. |
| Measured Results | | 0 ... <maxnoMeas> | | |
| >CHOICE Measured Results Value | M | | | |
| >>Value Angle of Arrival | M | | INTEGER (0 ... 719) | According to mapping in TS 36.133 [8] |
| >>Value Timing Advance Type 1 | M | | INTEGER (0 ... 7690) | According to mapping in TS 36.133 [8] |
| >>Value Timing Advance Type 2 | M | | INTEGER (0 ... 7690) | According to mapping in TS 36.133 [8] |
| >>SINR of Timing Advance Type 1 | O | | INTEGER (0 ...x) | |
| >>Result RSRP | | 1 ... <maxCellReport> | | |
| >>PCI | M | | INTEGER (0 ... 503, ...) | Physical Cell Identifier of the reported cell |
| >>>EARFCN | M | | INTEGER (0 ... 65535, ...) | Corresponds to NDL for FDD and NDL/UL for TDD in ref. TS 36.104 [5] |
| >>>ECGI | O | | ECGI 9.2.6 | E-UTRAN Cell Global Identifier of the reported cell |
| >>>Value RSRP | M | | INTEGER(0 ... 97, ...) | |
| >>>SINR of RSRP Result | O | | INTEGER (0 ...x) | |
| >>Result RSRQ | | 1 ... <maxCellReport> | | |
| >>>PCI | M | | INTEGER (0 ... 503, ...) | Physical Cell Identifier of the reported cell |
| >>>EARFCN | M | | INTEGER (0 ... 65535, ...) | Corresponds to NDL for FDD and NDL/UL for TDD in ref. TS 36.104 [5] |
| >>>ECGI | O | | ECGI 9.2.6 | E-UTRAN Cell Global Identifier of the reported cell |
| >>>Value RSRQ | M | | INTEGER(0 ... 34, ...) | |
| >>>SINR of RSRQ Result | O | | INTEGER (0 ...x) | |

The parameter "SINR of Timing Advance Type 1" in Table 6 above denotes the SINR of the CRS which is used for UE Rx-Tx time difference measurement. A corresponding IE e-CID-Measurement Result of TS36.455 is modified to provide the e-CID measurement result as follows:

```
E-CID-MeasurementResult ::= SEQUENCE {
    servingCell-ID              ECGI,
    servingCellTAC              TAC,
    e-UTRANAccessPointPosition  E-UTRANAccessPointPosition  OPTIONAL,
    measuredResults             MeasuredResults             OPTIONAL,
    ...
}
MeasuredResults ::= SEQUENCE (SIZE (1.. maxNoMeas)) OF MeasuredResultsValue
MeasuredResultsValue ::= CHOICE {
    valueAngleOfArrival             INTEGER (0..719),
    valueTimingAdvanceType1         INTEGER (0..7690),
    sinrOfvalueTimingAdvanceType1   INTEGER (0..x),
    valueTimingAdvanceType2         INTEGER (0..7690),
    resultRSRP                      ResultRSRP,
    sinrOfResultRSRP                INTEGER (0..x),
    resultRSRQ                      ResultRSRQ,
```

| | |
|---|---|
| sinrOfResultRSRQ | INTEGER (0..x), |
| ... | |
| } | |

The parameter "sinrOfvalueTimingAdvanceType1" above denotes the SINR of the CRS which is used for UE Rx-Tx time difference measurement. For OTDOA, the UE 130 reports the RSTD measurement results with corresponding PRS SINRs to the e-SMLC via LPP signalinig. Because RSTD is estimated from PRS from at least two cells (a neighbor cell and a reference cell), the SINR of the reference cell and neighbor cell are reported. The IE OTDOA-ProvideLocationInformation is used by the target device to provide OTDOA location measurements to the location server. It may also be used to provide an OTDOA positioning error reason. The IE OTDOA-ProvideLocationInformation of TS36.355 can be configured as follows:

```
-- ASN1START
OTDOA-ProvideLocationInformation ::= SEQUENCE {
    otdoaSignalMeasurementInformation   OTDOA-SignalMeasurementInformation   OPTIONAL,
    otdoa-Error                         OTDOA-Error                          OPTIONAL,
    ...
}
-- ASN1STOP
```

The IE OTDOA-SignalMeasurementInformation of TS36.355 is used by the target device to provide RSTD measurements to the location server. The RSTD measurements are provided for a neighbour cell and the RSTD reference cell, both of which are provided in the IE OTDOA-ProvideAssistanceData. The RSTD reference cell may or may not be the same as the assistance data reference cell provided in OTDOA-ReferenceCellInfo. If the target device stops reporting inter-frequency RSTD measurements, where the inter-frequency RSTD measurement is an OTDOA RSTD measurement with at least one cell on a frequency different from the serving cell frequency, the LPP layer may inform lower layers that inter-frequency RSTD measurements are stopped. The IE OTDOA-SignalMeasurementInformation can be modified (indicated by underlined text) as follows:

```
-- ASN1START
OTDOA-SignalMeasurementInformation ::= SEQUENCE {
    systemFrameNumber       BIT STRING (SIZE (10)),
    physCellIdRef           INTEGER (0..503),
    cellGlobalIdRef         ECGI                      OPTIONAL,
    earfcnRef               ARFCN-ValueEUTRA          OPTIONAL,
    sinrOfReferenceCell     INTEGER (0..x)            OPTIONAL,
    referenceQuality        OTDOA-MeasQuality         OPTIONAL,
    neighbourMeasurementList NeighbourMeasurementList,
    ...
}
NeighbourMeasurementList ::= SEQUENCE(SIZE(1..24)) OF
NeighbourMeasurementElement
NeighbourMeasurementElement ::= SEQUENCE {
    physCellIdNeighbor      INTEGER (0..503),
    cellGlobalIdNeighbour   ECGI                      OPTIONAL,
    earfcnNeighbour         ARFCN-ValueEUTRA          OPTIONAL,
    rstd                    INTEGER (0..12711),
    sinrOfNeighbourCell     INTEGER (0..x)            OPTIONAL,
    rstd-Quality            OTDOA-MeasQuality,
    ...
}
-- ASN1STOP
```

The e-SMLC or other network component chooses the believable (or acceptable) measurement results from the UE 130 for positioning calculation based on the reported CRS/PRS SINR(s) from the UE 130, e.g., chooses the measurements with reported SINRs that are greater than or equal to the pre-determined SINR threshold.

Figure 2:
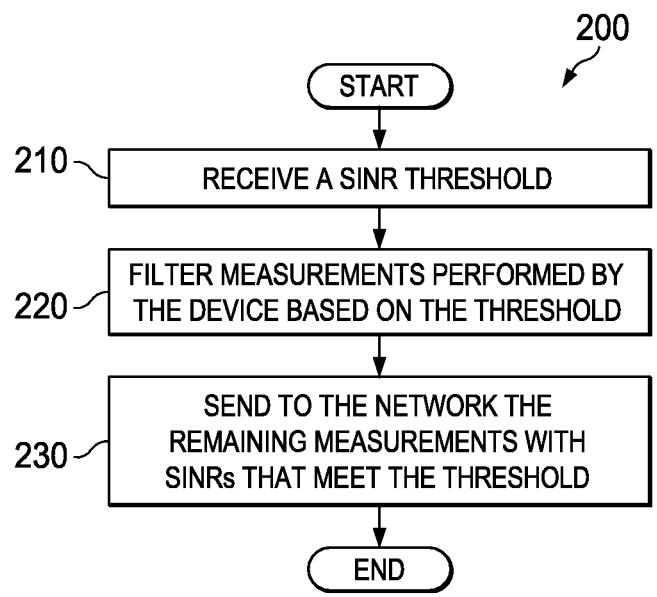
FIG. 2 illustrates an embodiment method for positioning in a wireless network.

FIG. 2 illustrates an embodiment method 200 for positioning calculation or positioning enhancement in a wireless network. The method 200 is implemented by a target device (e.g., the UE 130), which is provided an SINR threshold by the network. The target device then uses the threshold to filter out the relatively low SINR measurements and send the remaining acceptable or believable measurements to the network. The SINR threshold can be a minimum acceptable measurement level in dB. For example, the SINR threshold is equal to −6 dB for RSRP measurements for multi-cell positioning, as defined in TS36.133 section 9. The SINR threshold can be equal to −3 dB for UE Rx-Tx time difference measurements for PCells (as defined in TS36.133, section 9). The SINR threshold can be equal to −13 dB for RSTD measurements for cells (as defined in TS36.133, section 9).

At step 210, the SINR threshold is received, e.g., via RRC or LPP signaling IEs as described above. The network also sends measurement configurations to the device with the indicated threshold or separately. At step 220, measurements performed by the device are filtered based on the threshold. For instance, the device removes all measurement results (performed based on measurement configurations) corresponding detected SINRs below the indicated threshold. At step 230, the remaining measurements with SINRs that meet the threshold (e.g., above or equal to the threshold) are sent to the network. The network then uses the received filtered measurement results to perform positioning calculation.

Figure 3:
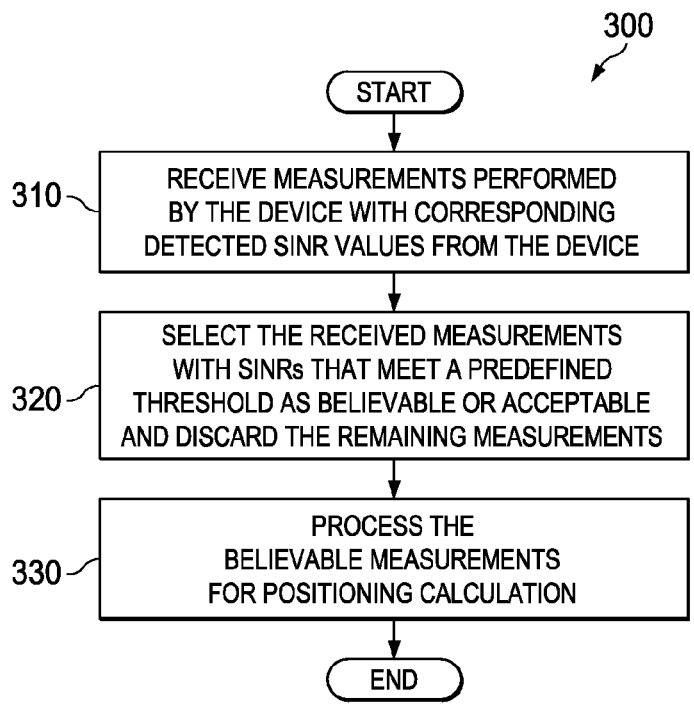
FIG. 3 illustrates another embodiment method for positioning in a wireless network.

FIG. 3 illustrates another embodiment method 300 for positioning calculation or positioning enhancement in a wireless network. The method 300 is implemented by the network (e.g., a positioning calculation component or server in the network), which is provided a plurality of (unfiltered) measurement results from a device with the corresponding SINRs for the measurements. The network then filters out the low SINR measurements based on a pre-defined SINR threshold, and uses the remaining measurements for positioning calculation. At step 310, measurements performed by the device are received with corresponding SINR values also measured by the device. The measurements and SINRs can be received via RRC and/or LPP signaling IEs as described above. At step 320, the received measurements with SINRs that meet a pre-defined threshold (e.g., above or equal to the threshold) are selected as believable or acceptable and the remaining measurements are discarded. At step 330, the believable measurements are processed for positioning calculation.

Figure 4:
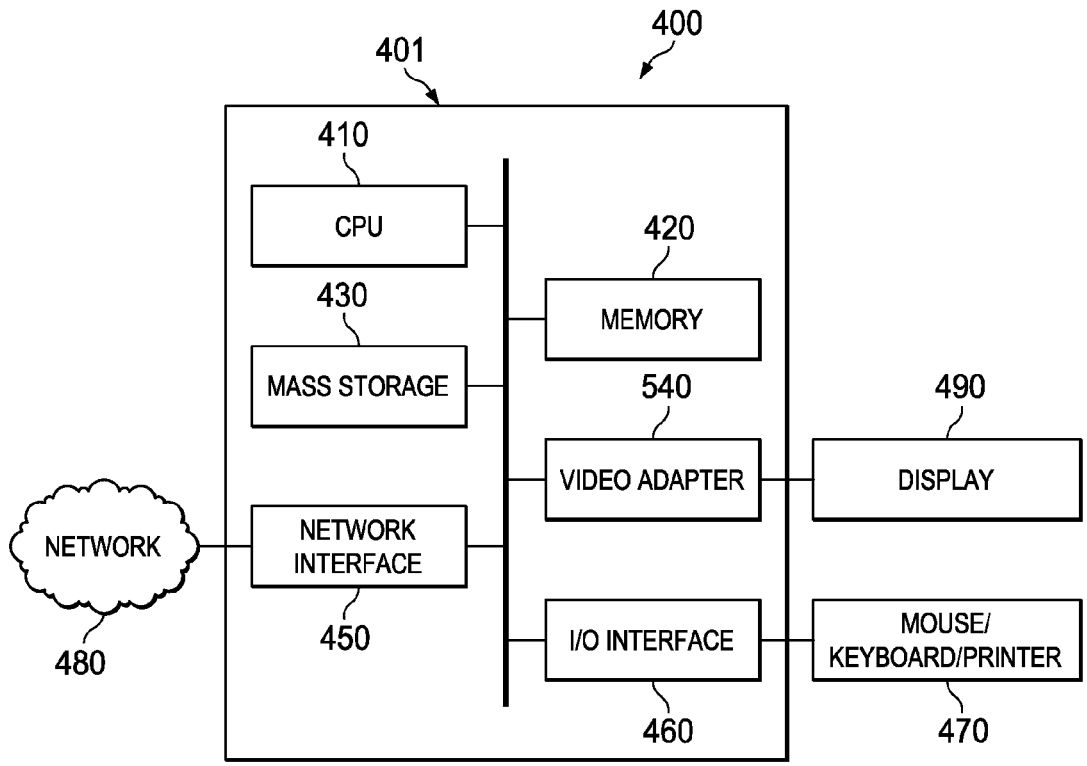
FIG. 4 is a block diagram of an embodiment communications device.

FIG. 4 is a block diagram of a processing system 400 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, a memory 420, a mass storage device 430, a video adapter 440, and an I/O interface 460 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 460 provide interfaces to couple external input and output devices to the processing unit. As illustrated, examples of input and output devices include a display 490 coupled to the video adapter 440 and any combination of mouse/keyboard/printer 470 coupled to the I/O interface 460. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

```
-- ASN1START
ReportConfigEUTRA ::=       SEQUENCE {
    triggerType                 CHOICE {
        event                       SEQUENCE {
            eventId                     CHOICE {
                eventA1                     SEQUENCE {
                    a1-Threshold                ThresholdEUTRA
                },
                eventA2                     SEQUENCE {
                    a2-Threshold                ThresholdEUTRA
                },
                eventA3                     SEQUENCE {
                    a3-Offset                   INTEGER (-30..30),
                    reportOnLeave               BOOLEAN
                },
                eventA4                     SEQUENCE {
                    a4-Threshold                ThresholdEUTRA
                },
                eventA5                     SEQUENCE {
                    a5-Threshold1               ThresholdEUTRA,
                    a5-Threshold2               ThresholdEUTRA
                },
                ...,
                eventA6-r10                 SEQUENCE {
                    a6-Offset-r10               INTEGER (-30..30),
                    a6-ReportOnLeave-r10        BOOLEAN
                }
            },
            hysteresis                  Hysteresis,
            timeToTrigger               TimeToTrigger
        },
        periodical                  SEQUENCE {
            purpose                     ENUMERATED {
```

```
                                                   reportStrongestCells, reportCGI}
            }
        },
        triggerQuantity                    ENUMERATED {rsrp, rsrq},
        sinrThresOfRSRP                    INTEGER (0..x)                    OPTIONAL,
        sinrThresOfRSRQ                    INTEGER (0..x)                    OPTIONAL,
        sinrThresOfUeRxTx                  INTEGER (0..x)                    OPTIONAL,
        reportQuantity                     ENUMERATED {sameAsTriggerQuantity, both},
        maxReportCells                     INTEGER (1..maxCellReport),
        reportInterval                     ReportInterval,
        reportAmount                       ENUMERATED {r1, r2, r4, r8, r16, r32, r64, infinity},
        ...,
        [[ si-RequestForHO-r9              ENUMERATED {setup}      OPTIONAL,    -- Cond reportCGI
           ue-RxTxTimeDiffPeriodical-r9    ENUMERATED {setup}      OPTIONAL     -- Need OR
        ]],
        [[ includeLocationInfo-r10          ENUMERATED {true}      OPTIONAL,    -- Cond reportMDT
           reportAddNeighMeas-r10          ENUMERATED {setup} OPTIONAL -- Need OR
        ]]
}
ThresholdEUTRA ::=                  CHOICE{
        threshold-RSRP                     RSRP-Range,
        threshold-RSRQ                     RSRQ-Range
}
-- ASN1STOP
```

```
-- ASN1START
ReportConfigEUTRA ::=       SEQUENCE {
    triggerType                         CHOICE {
        event                                       SEQUENCE {
            eventId                                         CHOICE {
                eventA1                                             SEQUENCE {
                    a1-Threshold                                            ThresholdEUTRA
                },
                eventA2                                             SEQUENCE {
                    a2-Threshold                                            ThresholdEUTRA
                },
                eventA3                                             SEQUENCE {
                    a3-Offset                                               INTEGER (-30..30),
                    reportOnLeave                                           BOOLEAN
                },
                eventA4                                             SEQUENCE {
                    a4-Threshold                                            ThresholdEUTRA
                },
                eventA5                                             SEQUENCE {
                    a5-Threshold1                                           ThresholdEUTRA,
                    a5-Threshold2                                           ThresholdEUTRA
                },
                ...,
                eventA6-r10                                         SEQUENCE {
                    a6-Offset-r10                                           INTEGER (-30..30),
                    a6-ReportOnLeave-r10                                    BOOLEAN
                }
            },
            hysteresis                                      Hysteresis,
            timeToTrigger                                   TimeToTrigger
        },
        periodical                                  SEQUENCE {
            purpose                                         ENUMERATED {
                                                                reportStrongestCells, reportCGI}
        }
    },
    triggerQuantity                     ENUMERATED {rsrp, rsrq},
    sinrThresOfRSRP                     INTEGER (0..x)                    OPTIONAL,
    sinrThresOfRSRQ                     INTEGER (0..x)                    OPTIONAL,
    sinrThresOfUeRxTx                   INTEGER (0..x)                    OPTIONAL,
    reportQuantity                      ENUMERATED {sameAsTriggerQuantity, both},
    maxReportCells                      INTEGER (1..maxCellReport),
    reportInterval                      ReportInterval,
    reportAmount                        ENUMERATED {r1, r2, r4, r8, r16, r32, r64, infinity},
    ...,
    [[ si-RequestForHO-r9               ENUMERATED {setup}      OPTIONAL,    -- Cond reportCGI
       ue-RxTxTimeDiffPeriodical-r9     ENUMERATED {setup}      OPTIONAL     -- Need OR
    ]],
    [[ includeLocationInfo-r10           ENUMERATED {true}      OPTIONAL,    -- Cond reportMDT
       reportAddNeighMeas-r10           ENUMERATED {setup} OPTIONAL -- Need OR
    ]]
```

```
}
ThresholdEUTRA ::=                  CHOICE{
        threshold-RSRP                      RSRP-Range,
        threshold-RSRQ                      RSRQ-Range
}
-- ASN1STOP.
```

```
-- ASN1START
MeasResults ::=                     SEQUENCE {
        measId                              MeasId,
        measResultPCell                     SEQUENCE {
                rsrpResult                          RSRP-Range,
                rsrpResult                          RSRQ-Range
        },
        measResultNeighCells                CHOICE {
                measResultListEUTRA                 MeasResultListEUTRA,
                measResultListUTRA                  MeasResultListUTRA,
                measResultListGERAN                 MeasResultListGERAN,
                measResultsCDMA2000                 MeasResultsCDMA2000,
                ...
        }                                                                       OPTIONAL,
        ...,
        [[      measResultForECID-r9        MeasResultForECID-r9                OPTIONAL
        ]],
        [[      locationInfo-r10            LocationInfo-r10                    OPTIONAL,
                measResultServFreqList-r10  MeasResultServFreqList-r10          OPTIONAL
        ]]
}
MeasResultListEUTRA ::=     SEQUENCE (SIZE (1..maxCellReport)) OF MeasResultEUTRA
MeasResultEUTRA ::=     SEQUENCE {
        physCellId                          PhysCellId,
        cgi-Info                            SEQUENCE {
                cellGlobalId                        CellGlobalIdEUTRA,
                trackingAreaCode                    TrackingAreaCode,
                plmn-IdentityList                   PLMN-IdentityList2          OPTIONAL
        }                                                                       OPTIONAL,
        measResult                          SEQUENCE {
                rsrpResult                          RSRP-Range                  OPTIONAL,
                sinrOfRSRPResult                    INTEGER (0..x)          OPTIONAL,
                rsrqResult                          RSRQ-Range                  OPTIONAL,
                sinrOfRSRQResult                    INTEGER (0..x)          OPTIONAL,
                ...,
                [[      additionalSI-Info-r9        AdditionalSI-Info-r9        OPTIONAL
                ]]
        }
}
MeasResultServFreqList-r10 ::=  SEQUENCE (SIZE (1..maxServCell-r10)) OF MeasResultServFreq-r10
MeasResultServFreq-r10 ::=          SEQUENCE {
        servFreqId-r10                      ServCellIndex-r10,
        measResultSCell-r10                 SEQUENCE {
                rsrpResultSCell-r10                 RSRP-Range,
                sinrOfRSRPResultSCell-r10           INTEGER (0..x),
                rsrqResultSCell-r10                 RSRQ-Range
                sinrOfRSRQResultSCell-r10           INTEGER (0..x),
        }                                                                       OPTIONAL,
        measResultBestNeighCell-r10         SEQUENCE {
                physCellId-r10                      PhysCellId,
                rsrpResultNCell-r10                 RSRP-Range,
                sinrOfRSRPResultNCell-r10           INTEGER (0..x),
                rsrqResultNCell-r10                 RSRQ-Range
                sinrOfRSRQResultNCell-r10           INTEGER (0..x),
        }                                                                       OPTIONAL,
        ...
}
MeasResultListUTRA ::=      SEQUENCE (SIZE (1..maxCellReport)) OF MeasResultUTRA
MeasResultUTRA ::=      SEQUENCE {
        physCellId                          CHOICE {
                fdd                                 PhysCellIdUTRA-FDD,
                tdd                                 PhysCellIdUTRA-TDD
        },
        cgi-Info                            SEQUENCE {
                cellGlobalId                        CellGlobalIdUTRA,
                locationAreaCode                    BIT STRING (SIZE (16))      OPTIONAL,
                routingAreaCode                     BIT STRING (SIZE (8))       OPTIONAL,
                plmn-IdentityList                   PLMN-IdentityList2          OPTIONAL
```

```
}                                                   OPTIONAL,
    measResult                              SEQUENCE {
        utra-RSCP                               INTEGER (-5..91)        OPTIONAL,
        sinrOfUTRA-RSCP                         INTEGER (0..x)          OPTIONAL,
        utra-EcN0                               INTEGER (0..49)         OPTIONAL,
        sinrOfUTRA-EcN0                         INTEGER (0..x)          OPTIONAL,
        ...,
        [[      additionalSI-Info-r9            AdditionalSI-Info-r9    OPTIONAL
        ]]
    }
}
MeasResultListGERAN ::=         SEQUENCE (SIZE (1..maxCellReport)) OF MeasResultGERAN
MeasResultGERAN ::=     SEQUENCE {
    carrierFreq                             CarrierFreqGERAN,
    physCellId                              PhysCellIdGERAN,
    cgi-Info                                SEQUENCE {
        cellGlobalId                            CellGlobalIdGERAN,
        routingAreaCode                         BIT STRING (SIZE (8))   OPTIONAL
    }                                                                   OPTIONAL,
    measResult                              SEQUENCE {
        rssi                                    INTEGER (0..63),
        sinrOfRSSI                              INTEGER (0..x)          OPTIONAL,
        ...
    }
}
MeasResultsCDMA2000 ::=         SEQUENCE {
    preRegistrationStatusHRPD           BOOLEAN,
    measResultListCDMA2000          MeasResultListCDMA2000
}
MeasResultListCDMA2000 ::=      SEQUENCE (SIZE (1..maxCellReport)) OF MeasResultCDMA2000
MeasResultCDMA2000 ::= SEQUENCE {
    physCellId                              PhysCellIdCDMA2000,
    cgi-Info                                CellGlobalIdCDMA2000        OPTIONAL,
    measResult                              SEQUENCE {
        pilotPnPhase                            INTEGER(0..32767)       OPTIONAL,
        pilotStrength                           INTEGER (0..63),
        sinrOfPilotStrength                     INTEGER (0..x)          OPTIONAL,
        ...
    }
}
MeasResultForECID-r9 ::=        SEQUENCE {
    ue-RxTxTimeDiffResult-r9                INTEGER (0..4095),
    sinrOfUE-RxTxTimeDiffResult-r9          INTEGER (0..x)              OPTIONAL,
    currentSFN-r9                           BIT STRING (SIZE (10))
}
PLMN-IdentityList2 ::=                  SEQUENCE (SIZE (1..5)) OF PLMN-Identity
AdditionalSI-Info-r9 ::=        SEQUENCE {
    csg-MemberStatus-r9                     ENUMERATED {member}         OPTIONAL,
    csg-Identity-r9                         CSG-Identity                OPTIONAL
}
-- ASN1STOP
```

What is claimed is:

1. A method implemented by a user device for enabling positioning calculation comprising:
receiving, from a network for cellular communications, a Signal to Interference plus Noise Ratio (SINR) threshold for filtering positioning measurements;
performing a plurality of positioning measurements, wherein the positioning measurements enable the network to calculate a position of the user device;
removing from the positioning measurements each measurement that does not meet the SINR threshold; and
sending, using a cellular communications link between the user device and a fixed base station of the network, remaining positioning measurements that meet the SINR threshold to the network.

2. The method of claim 1, wherein meeting the SINR threshold comprises having a corresponding SINR that is greater than or equal to the SINR threshold.

3. The method of claim 1, wherein the SINR threshold is received in a ReportConfigEUTRA information element (IE) comprising:

```
-- ASN1START
ReportConfigEUTRA ::=   SEQUENCE {
    triggerType                 CHOICE {
        event                       SEQUENCE {
            eventId                     CHOICE {
                eventA1                     SEQUENCE {
                    a1-Threshold                ThresholdEUTRA
                },
                eventA2                     SEQUENCE {
                    a2-Threshold                ThresholdEUTRA
```

```
                },
                eventA3              SEQUENCE {
                    a3-Offset            INTEGER (-30..30),
                    reportOnLeave        BOOLEAN
                },
                eventA4              SEQUENCE {
                    a4-Threshold         ThresholdEUTRA
                },
                eventA5              SEQUENCE {
                    a5-Threshold1        ThresholdEUTRA,
                    a5-Threshold2        ThresholdEUTRA
                },
                ...,
                eventA6-r10          SEQUENCE {
                    a6-Offset-r10        INTEGER (-30..30),
                    a6-ReportOnLeave-r10 BOOLEAN
                }
            },
            hysteresis               Hysteresis,
            timeToTrigger            TimeToTrigger
        },
        periodical                   SEQUENCE {
            purpose                      ENUMERATED {
                                             reportStrongestCells, reportCGI}
        }
    },
    triggerQuantity              ENUMERATED {rsrp, rsrq},
            sinrThresOfRSRP      INTEGER (0..x)      OPTIONAL,
    sinrThresOfRSRQ          INTEGER (0..x)   OPTIONAL,
    sinrThresOfUeRxTx        INTEGER (0..x)   OPTIONAL,
    reportQuantity           ENUMERATED {sameAsTriggerQuantity, both},
    maxReportCells           INTEGER (1..maxCellReport),
    reportInterval           ReportInterval,
    reportAmount             ENUMERATED {r1, r2, r4, r8, r16, r32, r64, infinity},
    ...,
    ,
}
ThresholdEUTRA ::=       CHOICE{
    threshold-RSRP           RSRP-Range,
    threshold-RSRQ           RSRQ-Range
}
-- ASN1STOP.
```

4. The method of claim 1, wherein the SINR threshold is received in a ReportConfigInterRAT information element (IE) comprising:

```
-- ASN1START
ReportConfigInterRAT ::=     SEQUENCE {
    triggerType                  CHOICE {
        event                        SEQUENCE {
            eventId                      CHOICE {
                eventB1                      SEQUENCE {
                    b1-Threshold                 CHOICE {
                        b1-ThresholdUTRA             ThresholdUTRA,
                        b1-ThresholdGERAN            ThresholdGERAN,
                        b1-ThresholdCDMA2000         ThresholdCDMA2000
                    }
                },
                eventB2                      SEQUENCE {
                    b2-Threshold1                ThresholdEUTRA,
                    b2-Threshold2                CHOICE {
                        b2-Threshold2UTRA            ThresholdUTRA,
                        b2-Threshold2GERAN           ThresholdGERAN,
                        b2-Threshold2CDMA2000        ThresholdCDMA2000
                    }
                },
                ...
            },
            hysteresis                   Hysteresis,
            timeToTrigger                TimeToTrigger
        },
        periodical                   SEQUENCE {
            purpose                      ENUMERATED {
                                             reportStrongestCells,
```

```
                                                    reportStrongestCellsForSON,
                                                                   reportCGI}
        }
    },
    maxReportCells                  INTEGER (1..maxCellReport),
    reportInterval                  ReportInterval,
    sinrThresOfUtraRSCP             INTEGER (0..x)              OPTIONAL,
    sinrThresOfUtraEcN0             INTEGER (0..x)              OPTIONAL,
    sinrThresOfGERANRSSI            INTEGER (0..x)              OPTIONAL,
    sinrThresOfCDMA2000PilotStrength INTEGER (0..x)             OPTIONAL,
    reportAmount                    ENUMERATED {r1, r2, r4, r8, r16, r32, r64, infinity},
    ...,
    [[ si-RequestForHO-r9           ENUMERATED {setup}   OPTIONAL -- Cond reportCGI
    ]],
    [[ reportQuantityUTRA-FDD-r10   ENUMERATED {both}    OPTIONAL -- Need OR
    ]]
}
ThresholdUTRA ::=                   CHOICE{
    utra-RSCP                                           INTEGER (-5..91),
    utra-EcN0                                           INTEGER (0..49)
}
ThresholdGERAN ::=                  INTEGER (0..63)
ThresholdCDMA2000 ::=               INTEGER (0..63)
-- ASN1STOP.
```

5. The method of claim 1, wherein the SINR threshold is received in a ECID-RequestLocationInformation information element (IE) comprising:

```
-- ASN1START
ECID-RequestLocationInformation ::= SEQUENCE {
    requestedMeasurements   BIT STRING {  rsrpReq    (0),
                                          rsrqReq    (1),
                                          ueRxTxReq  (2)    } (SIZE(1..8)),
    sinrThresOfUeRxTx  INTEGER (0..x)         OPTIONAL,
    sinrThresOfRSRP    INTEGER (0..x)         OPTIONAL,
    sinrThresOfRSRQ    INTEGER (0..x)         OPTIONAL,
    ...
}
-- ASN1STOP.
```

6. The method of claim 1, wherein the SINR threshold is received in a OTDOA-RequestLocationInformation information element (IE) comprising:

```
-- ASN1START
OTDOA-RequestLocationInformation ::= SEQUENCE {
    assistanceAvailability    BOOLEAN,
    sinrThresOfReferenceCell INTEGER (0..x)    OPTIONAL,
    sinrThresOfNeighbourCell INTEGER (0..x)    OPTIONAL,
    ...
}
-- ASN1STOP.
```

7. The method of claim 1, wherein the SINR threshold is received in an enhanced Cell ID (e-CID) measurement initiation request information element (IE) comprising:

```
MeasurementQuantities-Item ::= SEQUENCE {
    measurementQuantitiesValue   MeasurementQuantitiesValue,
    iE-Extensions                ProtocolExtensionContainer { {
MeasurementQuantitiesValue-ExtIEs} } OPTIONAL,
    ...
}
MeasurementQuantitiesValue-ExtIEs LPPA-PROTOCOL-
EXTENSION ::= {
    ...
}
MeasurementQuantitiesValue ::= ENUMERATED {
```

```
                -continued cell-ID,
    angleOfArrival,
    timingAdvanceType1,
    timingAdvanceType2,
    rSRP,
    rSRQ,
    sINRThresOfRSRP,
    sINRThresOfRSRQ,
    sINRThresOfUeRxTx
    ...
}.
```

8. A user device for supporting positioning calculation comprising:
  a processor; and
  a computer readable storage medium storing programming for execution by the processor, the programming including instructions to:
    receive, from a network for cellular communications, a Signal to Interference plus Noise Ratio (SINR) threshold for filtering positioning measurements;
    perform a plurality of positioning measurements, wherein the positioning measurements enable the network to calculate a position of the user device;
    remove from the positioning measurements each measurement that does not meet the SINR threshold; and
    send, using a cellular communications link between the user device and a fixed base station of the network, remaining positioning measurements that meet the SINR threshold to the network.

9. The user device of claim 8, wherein the positioning measurements are Reference Signal Received Power (RSRP) measurements.

10. The user device of claim 8, wherein the positioning measurements are Reference Signal Time Difference (RSTD) measurements.

11. The user device of claim 8, wherein the positioning measurements are UE Rx-Tx time difference measurements.

12. The method of claim 8, wherein the SINR threshold is received via Radio Resource Control (RRC) signaling.

13. The user device of claim 8, wherein the SINR threshold is received via LTE Positioning Protocol (LPP) signaling.

14. A method implemented by a network component for enabling positioning calculation comprising:

receiving a plurality of positioning measurements with a plurality of corresponding Signal to Interference plus Noise Ratios (SINRs) from a user device, wherein the positioning measurements enable the network component to calculate a position of the user device;

removing from the positioning measurements each measurement with a corresponding SINR that is less than or equal to a pre-determined SINR threshold for filtering the positioning measurements; and using remaining positioning measurements with corresponding SINRs greater than the SINR threshold for positioning calculation.

15. The method of claim 14 further, wherein the user device is optionally configured to send the SINRs with the positioning measurements by sending a signal to instruct the user device to send the SINRs with the positioning measurements.

16. The method of claim 14, wherein the SINR threshold is received in a ECID-ProvideLocationInformation information element (IE) comprising:

```
-- ASN1START
ECID-ProvideLocationInformation ::= SEQUENCE {
    ecid-SignalMeasurementInformation    ECID-SignalMeasurementInformation    OPTIONAL,
    ecid-Error                           ECID-Error                           OPTIONAL,
    ...
}
-- ASN1STOP.
```

17. The method of claim 14, wherein the SINR threshold is received in a ECID-SignalMeasurementInformation information element (IE) comprising:

```
-- ASN1START
ECID-SignalMeasurementInformation ::= SEQUENCE {
    primaryCellMeasuredResults      MeasuredResultsElement OPTIONAL,
    measuredResultsList             MeasuredResultsList,
    ...
}
MeasuredResultsList ::= SEQUENCE (SIZE(1..32)) OF MeasuredResultsElement
MeasuredResultsElement ::= SEQUENCE {
    physCellId                      INTEGER (0..503),
    cellGlobalId                    CellGlobalIdEUTRA-AndUTRA   OPTIONAL,
    arfcnEUTRA                      ARFCN-ValueEUTRA,
    systemFrameNumber               BIT STRING (SIZE (10))      OPTIONAL,
    rsrp-Result                     INTEGER (0..97)             OPTIONAL,
    sinrOfRSRP-Result INTEGER (0..x)                            OPTIONAL,
    rsrq-Result                     INTEGER (0..34)             OPTIONAL,
    sinrOfRSRQ-Result INTEGER (0..x)                            OPTIONAL,
    ue-RxTxTimeDiff INTEGER (0..4095)                           OPTIONAL,
    sinrOfUE-RxTxTimeDiff INTEGER (0..x)                        OPTIONAL,
    ...
}
-- ASN1STOP.
```

18. The method of claim 14, wherein the SINR threshold is received in a OTDOA-SignalMeasurementInformation information element (IE) comprising:

```
-- ASN1START
OTDOA-SignalMeasurementInformation ::= SEQUENCE {
    systemFrameNumber       BIT STRING (SIZE (10)),
    physCellIdRef           INTEGER (0..503),
    cellGlobalIdRef         ECGI                            OPTIONAL,
    earfcnRef               ARFCN-ValueEUTRA                OPTIONAL,
    sinrOfReferenceCell     INTEGER (0..x)                  OPTIONAL,
    referenceQuality        OTDOA-MeasQuality               OPTIONAL,
    neighbourMeasurementList    NeighbourMeasurementList,
    ...
}
NeighbourMeasurementList ::= SEQUENCE (SIZE(1..24)) OF NeighbourMeasurementElement
NeighbourMeasurementElement ::= SEQUENCE {
```

-continued

```
    physCellIdNeighbor      INTEGER (0..503),
    cellGlobalIdNeighbour  ECGI                          OPTIONAL,
    earfcnNeighbour         ARFCN-ValueEUTRA              OPTIONAL,
    rstd                    INTEGER (0..12711),
    sinrOfNeighbourCell     INTEGER (0..x)                OPTIONAL,
    rstd-Quality            OTDOA-MeasQuality,
    ...
}
-- ASN1STOP.
```

19. The method of claim 14, wherein the SINR threshold is received in an enhanced Cell ID (e-CID) measurement result information element (IE) comprising:

```
E-CID-MeasurementResult ::= SEQUENCE {
    servingCell-ID               ECGI,
    servingCellTAC               TAC,
    e-UTRANAccessPointPosition   E-UTRANAccessPointPosition   OPTIONAL,
    measuredResults              MeasuredResults              OPTIONAL,
    ...
}
MeasuredResults ::= SEQUENCE (SIZE (1.. maxNoMeas)) OF MeasuredResultsValue
MeasuredResultsValue ::= CHOICE {
    valueAngleOfArrival          INTEGER (0..719),
    valueTimingAdvanceType1      INTEGER (0..7690),
    sinrOfvalueTimingAdvanceType1 INTEGER (0..x),
    valueTimingAdvanceType2      INTEGER (0..7690),
    resultRSRP                   ResultRSRP,
    sinrOfResultRSRP             INTEGER (0..x),
    resultRSRQ                   ResultRSRQ,
    sinrOfResultRSRQ             INTEGER (0..x),
    ...}.
```

20. An apparatus for supporting positioning calculation comprising:
   a processor; and
   a computer readable storage medium storing programming for execution by the processor, the programming including instructions to:
      receive a plurality of positioning measurements with a plurality of corresponding Signal to Interference plus Noise Ratios (SINRs) from a user device, wherein the positioning measurements enable the apparatus to calculate a position of the user device;
      remove from the positioning measurements each measurement with a corresponding SINR that is less than or equal to a pre-determined SINR threshold for filtering the positioning measurements; and
      use remaining positioning measurements with corresponding SINRs greater than the SINR threshold for positioning calculation.

21. The apparatus of claim 20, wherein the SINRs are received at an E-UTRAN node B (eNB) from the user device via Radio Resource Control (RRC) signaling.

22. The apparatus of claim 20, wherein the SINRs are received at a positioning server from the user device via LTE Positioning Protocol (LPP) signaling.

23. The apparatus of claim 20, wherein the SINRs are received at a positioning server from the user device via an E-UTRAN node B (eNB), and wherein the SINRs are received at the eNB via Radio Resource Control (RRC) signaling and subsequently at the positioning server via LTE Positioning Protocol-a (LPPa) signaling.

24. The apparatus of claim 20, wherein the user device is optionally configurable to send the positioning measurements without the SINR, and wherein the programming includes further instructions to configure the user device to send the SINRs with the positioning measurements.

* * * * *